US008209084B2

(12) United States Patent
Fujinaga

(10) Patent No.: US 8,209,084 B2
(45) Date of Patent: Jun. 26, 2012

(54) PROGRAM MANAGEMENT SYSTEM

(75) Inventor: Terumitsu Fujinaga, Chiryu (JP)

(73) Assignee: Denso Corporation, Kariya, Aichi-Pref. (JP)

(*) Notice: Subject to any disclaimer, the term of this patent is extended or adjusted under 35 U.S.C. 154(b) by 1218 days.

(21) Appl. No.: 11/730,996

(22) Filed: Apr. 5, 2007

(65) Prior Publication Data

US 2007/0239329 A1 Oct. 11, 2007

(30) Foreign Application Priority Data

Apr. 7, 2006 (JP) ................................ 2006-106240

(51) Int. Cl.
*G06F 19/00* (2006.01)
*G08B 23/00* (2006.01)

(52) U.S. Cl. ............. 701/35; 701/34; 701/33; 455/419; 455/423

(58) Field of Classification Search .................... 701/35, 701/29, 33, 34; 455/419, 423; 340/853.1; 705/8, 36
See application file for complete search history.

(56) References Cited

U.S. PATENT DOCUMENTS 5,442,553 A 8/1995 Parrillo
5,815,071 A 9/1998 Doyle
6,571,191 B1 5/2003 York et al.
6,681,174 B1 * 1/2004 Harvey et al. ................ 701/117
6,816,953 B2 11/2004 Hurich
6,847,892 B2 * 1/2005 Zhou et al. .................... 701/213
7,359,772 B2 * 4/2008 Paturi et al. ..................... 701/29
7,397,392 B2 * 7/2008 Mahoney et al. ............. 340/988
7,469,177 B2 * 12/2008 Samad et al. .................. 701/54
2003/0055552 A1 3/2003 Akins et al.
2003/0055666 A1 * 3/2003 Roddy et al. ..................... 705/1
2005/0060070 A1 * 3/2005 Kapolka et al. ................ 701/29
2005/0222933 A1 * 10/2005 Wesby ........................... 705/36

FOREIGN PATENT DOCUMENTS

JP 9-187072 7/1997
JP 10-83355 3/1998
JP 2005-157637 6/2005
JP 2006-209354 8/2006

OTHER PUBLICATIONS

European Search Report dated Jul. 26, 2007 in Application No. 07007126.1.

* cited by examiner

*Primary Examiner* — Ronnie Mancho
(74) *Attorney, Agent, or Firm* — Nixon & Vanderhye PC

(57) ABSTRACT

A program management system includes a center and a vehicle control device having a program in a vehicle. In management processing, the center selects one of preset examination methods, and requests the vehicle control device to send data according to the selected examination method. When receiving the request, the vehicle control device extracts data pertaining to the program according to the examination method specified by the request, and transmits the extracted data to the center. When receiving data from the vehicle control device, the center determines whether or not the value of the received data is within a preset permissible range, and thereby determines the presence or absence of an anomaly in the program installed in the vehicle control device.

33 Claims, 5 Drawing Sheets

PROGRAM MANAGEMENT SYSTEM

CROSS REFERENCE TO RELATED APPLICATION

This application is based on and incorporates herein by reference Japanese Patent Application No. 2006-106240 filed on Apr. 7, 2006.

FIELD OF THE INVENTION

The present invention relates to a program management system wherein a management device and a vehicle periodically communicate with each other and the management device manages a program installed in the vehicle.

BACKGROUND OF THE INVENTION

There are known program management systems capable of detecting an anomaly (malfunction, etc.) in a program installed in a vehicle (i.e., vehicle control device). Specifically, in response of receipt of a request for a control parameter from a management device, a CPU mounted in a vehicle transmits the requested control parameter to the management device. The management device determines whether or not the content of the control parameter is within the range of an expected value based on the content (history) stored in the management device, and thereby detects any anomaly (malfunction, etc.) in a program installed in the vehicle. (Refer to Patent Document 1, for example.)

Patent Document 1: JP-B1-3325899 (U.S. Pat. No. 5,815, 071)

However, the above program management system involves a problem. If any anomaly occurs in a program with the control parameter transmitting function maintained, the management device receives the control parameter as an appropriate one. Therefore, there are cases where an anomaly in a program cannot be detected in the above system. An example will be taken. A program referred to by the CPU in the vehicle may be rewritten by a malicious person as a fraudulent control program having a function of transmitting a control parameter in response to receipt of a request for the control parameter. In this case, the program is brought into the state of an "anomaly with the control parameter transmitting function maintained," and this anomaly cannot be detected at the management device.

SUMMARY OF THE INVENTION

In consideration of the above problem, it is an object of the invention to make it possible to reliably detect an anomaly in a control program installed in a vehicle control device in a program management system having a center and the vehicle control device that can communicate with the center.

According to an aspect of the present invention, a program management system including a vehicle control device and a management device is provided as follows. The vehicle control device has a program. The management device manages the program of the vehicle control device. The vehicle control device and the management device communicate with each other. The vehicle control device includes a communication control unit that receives a request for data specifying an examination method from the management device, extracts data pertaining to the program based on the specified examination method, and transmits the extracted data to the management device. The management device includes the following: (i) an examination method selecting unit that selects at least one examination method from a plurality of preset examination methods; (ii) a requesting unit that makes a request for data based on the selected examination method to the vehicle control device; and (iii) a data range determining unit that receives the data transmitted by the communication control unit of the vehicle control device based on the request by the requesting unit, and determines that there is no anomaly in the program installed in the vehicle control device when the received data is within a preset permissible range or that there is an anomaly in the program when the received data is out of the preset permissible range.

With the above structure, therefore, the vehicle or vehicle control device is caused to transmit data corresponding to the examination method specified at the management device or center. Therefore, when there is no anomaly in the control program installed in the vehicle control device, the vehicle control device can transmit data based on the specified examination method. Meanwhile, when there is any anomaly in the control program installed in the vehicle control device, the vehicle control device cannot properly transmit data based on the specified examination method.

Therefore, the management device can reliably detect any anomaly in the control program installed in the vehicle control device based on data received from the vehicle control device. Here, for instance, the examination selecting unit can determine or select an examination method based on a time when starting the processing or based on the previously selected examination method.

Here, data pertaining to the program held by the vehicle control device can be a part or a whole of the program, or a parameter used for the program. Alternatively, it can be a result from computation applied to a fragment extracted from the program.

The requesting unit of the management device can be designed to send an examination program to the vehicle control device to cause the vehicle control device to execute the sent examination program; thus, the management device receives the resultant data from the vehicle control device. Further, multiple examination methods may be previously stored in the vehicle control device; then, the requesting unit may only specify one of the examination methods which should be executed in the vehicle control device.

According to another aspect of the present invention, a program management system including a vehicle control device and a management device is provided as follows. The vehicle control device has a program. The management device manages the program of the vehicle control device. The vehicle control device and the management device communicate with each other. The vehicle control device includes (i) an examination method selecting unit that selects at least one examination method from a plurality of preset examination methods, and (ii) a communication control unit that extracts data pertaining to the program according to the selected examination method and transmits the extracted data, together with identification information indicating the selected examination method, to the management device. The management device includes a data range determining unit that receives data transmitted by the communication control unit of the vehicle control device and determines that there is no anomaly in the program installed in the vehicle control device when the received data is within a permissible range preset in correspondence with the identification information or that there is an anomaly in the program when the received data is out of the permissible range.

With the above structure, therefore, the vehicle control device transmits data corresponding to the examination method specified by the vehicle control device itself, together with the identification information, to the management device. Consequently, when there is no anomaly in a control program installed in the vehicle control device, the vehicle control device can properly transmit data to be transmitted and identification information corresponding to this data. Meanwhile, when there is any anomaly in a control program installed in the vehicle control device, the vehicle control device cannot properly bring identification information into correspondence with data to be transmitted.

Therefore, the management device can reliably detect any anomaly in a control program installed in the vehicle control device based on data received from the vehicle control device or vehicle.

According to yet another aspect of the present invention, a program management system is provided as follows. A vehicle control device has a program. A management device manages the program of the vehicle control device. A communication control unit in the vehicle control device communicates data with the management device. Examination method selecting means is configured to select at least one examination method from a plurality of preset examination methods. Extracting means is configured to extract data pertaining to the program according to the selected examination method. Data range determining means is configured to determine that there is no anomaly in the program installed in the vehicle control device when the extracted data is within a preset permissible range preset or that there is an anomaly in the program when the extracted data is out of the preset permissible range.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereafter, description will be given to embodiments of the invention with reference to drawings.

First Embodiment

Figure 1:
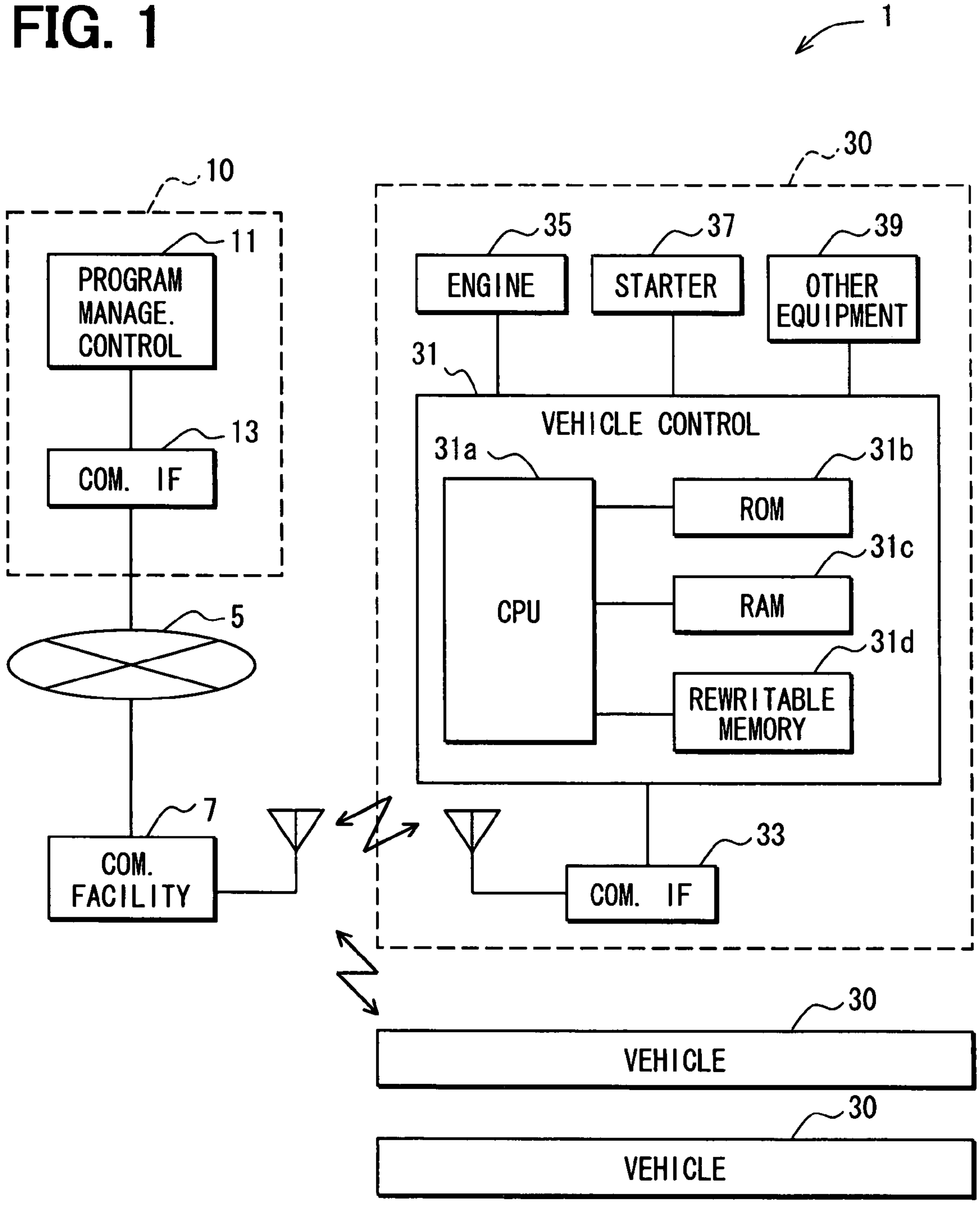
FIG. 1 is a block diagram illustrating the overview of a program management system.

FIG. 1 is a block diagram illustrating the overview of a program management system 1 in a first embodiment.

This program management system 1 is so designed to manage a control program installed in a vehicle 30 at a management center 10 (i.e., management device). The system 1 is so constructed that the management center 10 and multiple vehicles 30 can communicate with each other by radio through an Internet network 5 and a communication facility 7 for radio communication.

The management center 10 includes: a program management control unit 11 constructed as a publicly known microcomputer having CPU, ROM, RAM, and the like; and a communication interface (I/F) 13 for the program management control unit 11 to carry out data communication with an external source.

The CPU of the program management control unit 11 sequentially communicates with multiple vehicles 30 according to a management program stored in the ROM. It is thereby updates a control program installed in a vehicle 30 and carries out processing (management processing described later) for detecting any anomaly in a control program. An anomaly in a control program can be caused by a specific bit in the control program being inverted by noise, the program being tampered by a malicious person, or the like.

The vehicle 30 includes: a vehicle control device 31 for controlling an engine 35, an engine starter 37, and other equipment 39; and a communication interface 33 for the vehicle control device 31 to carry out data communication with an external source.

The vehicle control device 31 is constructed as a publicly known microcomputer having CPU 31*a*, ROM 31*b*, RAM 31*c*, and rewritable memory 31*d*, and the CPU 31*a* controls the relevant vehicle 30 according to programs stored in the ROM 31*b* and the rewritable memory 31*d*. Further, the CPU 31*a* carries out vehicle processing described later according to a management program stored beforehand in the ROM 31*b*.

The reason why the management program is stored in the ROM 31*b*, not in the rewritable memory 31*d* is to prevent inability to start the management program because of a rewrite error after the contents of the rewritable memory 31*d* are rewritten.

However, the management program may be stored in the rewritable memory 31*d*, not in the ROM 31*b*. Further, even when the management program is stored in the rewritable memory 31*d*, inability to start the management program because of a rewrite error can be prevented as long as it is stored in an area where rewrite is infeasible by ordinary rewrite processing.

Figure 2:
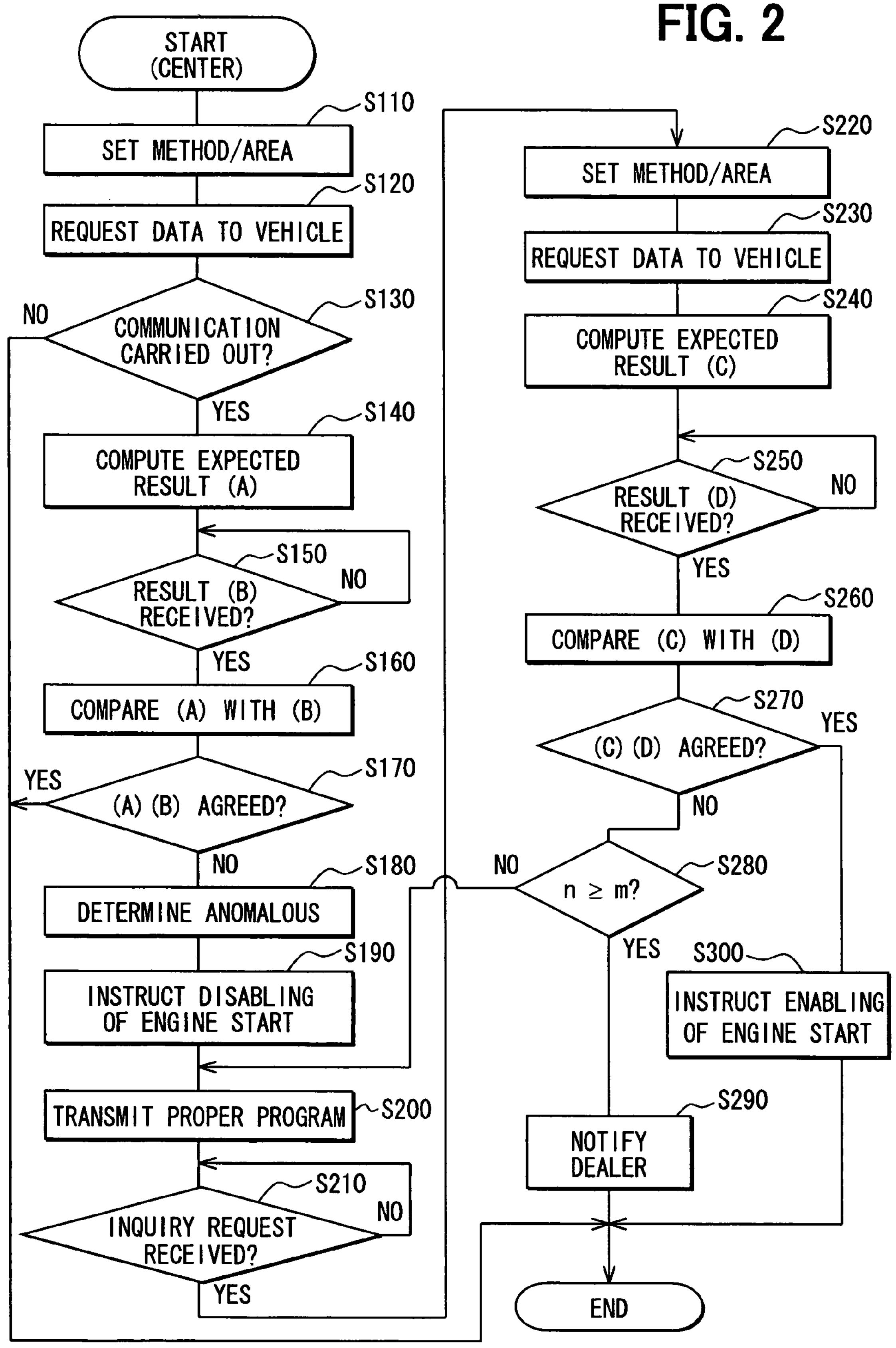
FIG. 2 is a flowchart illustrating management processing in a first embodiment.

Description will be given to processing for detecting any anomaly in a control program stored in the rewritable memory 31*d* in a vehicle 30 in this program management system 1 with reference to FIG. 2. FIG. 2 is a flowchart illustrating the management processing carried out by the program management control unit 11 (CPU) of the management center 10.

This management processing is periodically, for example, and sequentially started for the individual vehicles 30 (start control means or unit). First, a computing method and an examination area are set on a random basis (S110: examination method selecting means or unit, examination area selecting means or unit, computing method selecting means or unit). In this processing, for example, a random number is generated in the CPU, and preset examination method and examination area are set according to this random number. (This is the same with S220.)

Figure 3A:
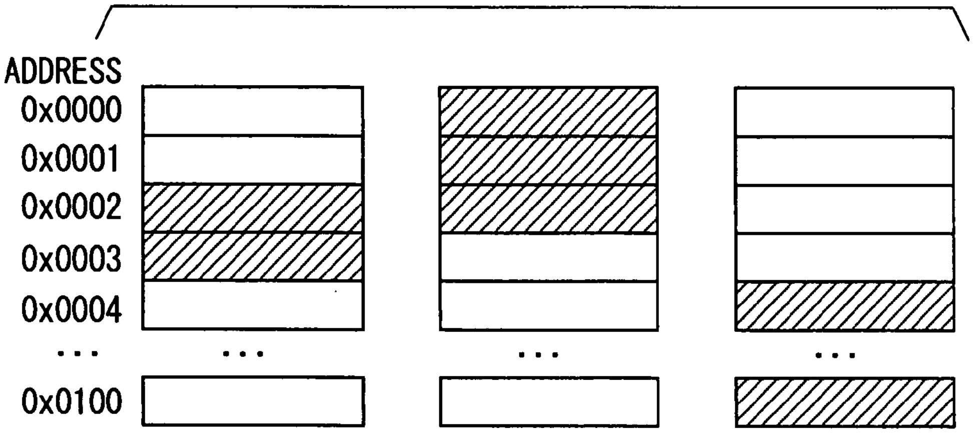
FIGS. 3A to 3C are explanatory drawings illustrating examples of a range of program data selection.

The examination area is set, for example, as follows: a starting address and an ending address are selected; and thus an arbitrary data range whose both ends are located at these addresses is set. This examination area is, for example, the area hatched in FIG. 3A.

Figure 3B:
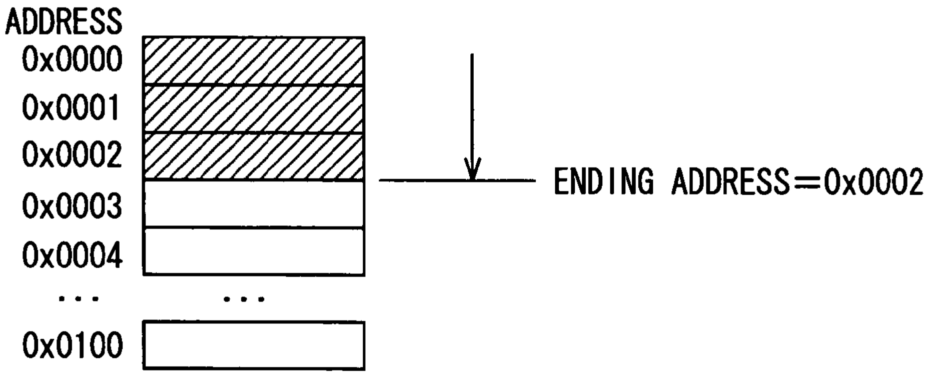

When an examination area is set, however, only an ending address may be selected as illustrated in FIG. 3B. In this case, the starting address is set to a preset address (e.g., initial address). By selecting an examination area as mentioned above, processing in the program management control unit 11 or the vehicle control device 31 can be simplified as compared with cases where an examination starting address and an examination ending address are selected. That is, with this construction, the logic of the program can be simplified, and thus the processing load exerted when this program is started can be lessened.

Figure 3C:
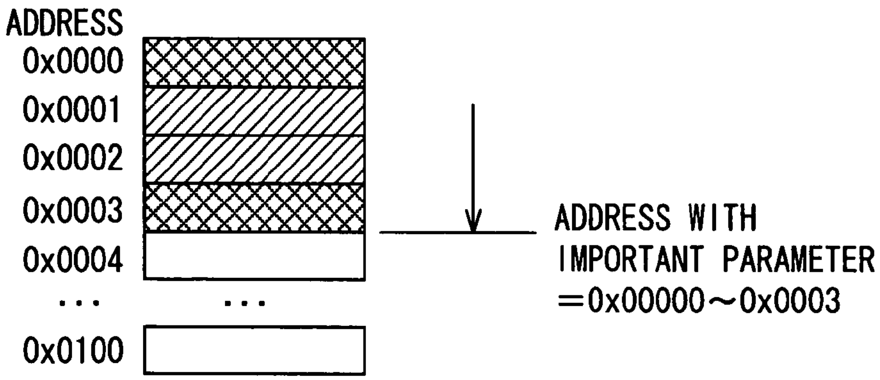

When an address area where an important parameter is stored is known, as illustrated in FIG. 3C, all or at least part of the address area may be selected when an examination area is set. By selecting an examination area as mentioned above, data important to the vehicle control device 31 can be selectively checked at the management center 10. Therefore, a basic function of the vehicle control device 31 can be prevented from being lost by an anomaly that occurs in important data.

Description will be back to FIG. 2. Data corresponding to the set computing method and examination area is requested from the vehicle 30 (S120: requesting means or unit). That is, a computation command is transmitted to the vehicle 30. In response to receipt of the request for data in this processing, the vehicle 30 carries out the vehicle processing illustrated in FIG. 4. (This vehicle processing will be described in detail later.) Then, the vehicle 30 sends the computation result (B) corresponding to the set computing method and examination area back to the management center 10.

Subsequently, it is determined whether or not communication with the vehicle 30 has been successfully carried out (S130). When the communication has not been successfully carried out (S130: NO), it is determined that the vehicle 30 is in a communication impossible state, and the management processing is terminated. When communication with the vehicle 30 has been successfully carried out (S130: YES), a computation result (A) expected as response data from the vehicle 30 is computed (S140: reckoning means or unit). For instance, when a checksum method is selected as the computing method, the checksum in the data in the set examination area is computed here. As a computing method other than the checksum method, any computing method can be adopted. For example, a method in which data in the examination area is alternately added and subtracted may be used.

It is determined whether or not the computation result (B) has been received from the vehicle 30 (S150) (S150 to S180: data range determining means or unit). When the computation result (B) has not been received (S150: NO), this processing is repeated. When the computation result (B) has been received (S150: YES), the program management control unit's own computation result (A) is compared with the received computation result (B) (S160).

Subsequently, it is determined whether or not these computation results (A) and (B) agree with each other (S170). When they agree with each other (S170: YES), it is determined that the control program installed in the vehicle 30 is free from an anomaly, and the management processing is terminated. When they do not agree with each other (S170: NO), it is determined that the program is anomalous (S180), and the vehicle 30 is instructed to bring the engine 35 into a start disabled state (S190: first instructing means or unit).

Then, proper program data (legitimate program data free from an anomaly) is transmitted to the vehicle 30 (S200: program transmitting means or unit).

When proper program data is received in the vehicle processing, in the vehicle 30, the control program stored in the rewritable memory 31*d* is overwritten with this program data, and it is stored. An inquiry request to confirm whether or not the program has been normally overwritten is transmitted to the management center 10.

In the management processing, consequently, it is determined whether or not this inquiry request has been received from the vehicle 30 (S210). When the inquiry request has not been received (S210: NO), this processing is repeated. When the inquiry request has been received (S210: YES), a computation method is set on a random basis and the examination area is set to all the areas in the control program (S220).

At S230 to S270, the same processing as the above-mentioned processing of S120 and S140 to S170 is carried out.

That is, data corresponding to the set computing method and examination area is requested from the vehicle 30 (S230). A computation result (C) expected as response data from the vehicle 30 is computed (S240).

Then, it is determined whether or not a computation result (D) has been received from the vehicle 30 (S250). When the computation result (D) has not been received (S250: NO), this processing is repeated. When the computation result (D) has been received (S250: YES), the program management control unit's own computation result (C) is compared with the received computation result (D) (S260: rewrite determining means or unit)

Subsequently, it is determined whether or not these computation results (C) and (D) agree with each other (S270: rewrite determining means or unit).

When these computation results (C) and (D) agree with each other (S270: YES), it is determined that the control program installed in the vehicle 30 is free from an anomaly. The vehicle 30 is instructed to bring the engine 35 into a start enabled state (S300: second instructing means or unit), and the management processing is terminated.

When the computation results (C) and (D) do not agree with each other (S270: NO), the number of times when disagreement is determined at S270 is incremented and the count is stored in a temporary memory such as the RAM. Then, it is determined whether or not this number n of times of disagreement is greater than a preset reference number m of times (e.g., three times) (S280: monitoring means or unit).

When the number n of times of disagreement is equal to or greater than the reference number m of times (S280: YES), it is notified to a vehicle dealer as the preset point of contact that the control program installed in the vehicle 30 cannot be rewritten as a legitimate program (S290: second notifying means or unit), and this management processing is terminated. When the number n of times of disagreement is less than the reference number m of times (S280: NO), the processing of S200 and the following steps is repeated.

After the processing of S290 or S300 is carried out, the number n of times of disagreement is cleared (n←0).

Figure 4:
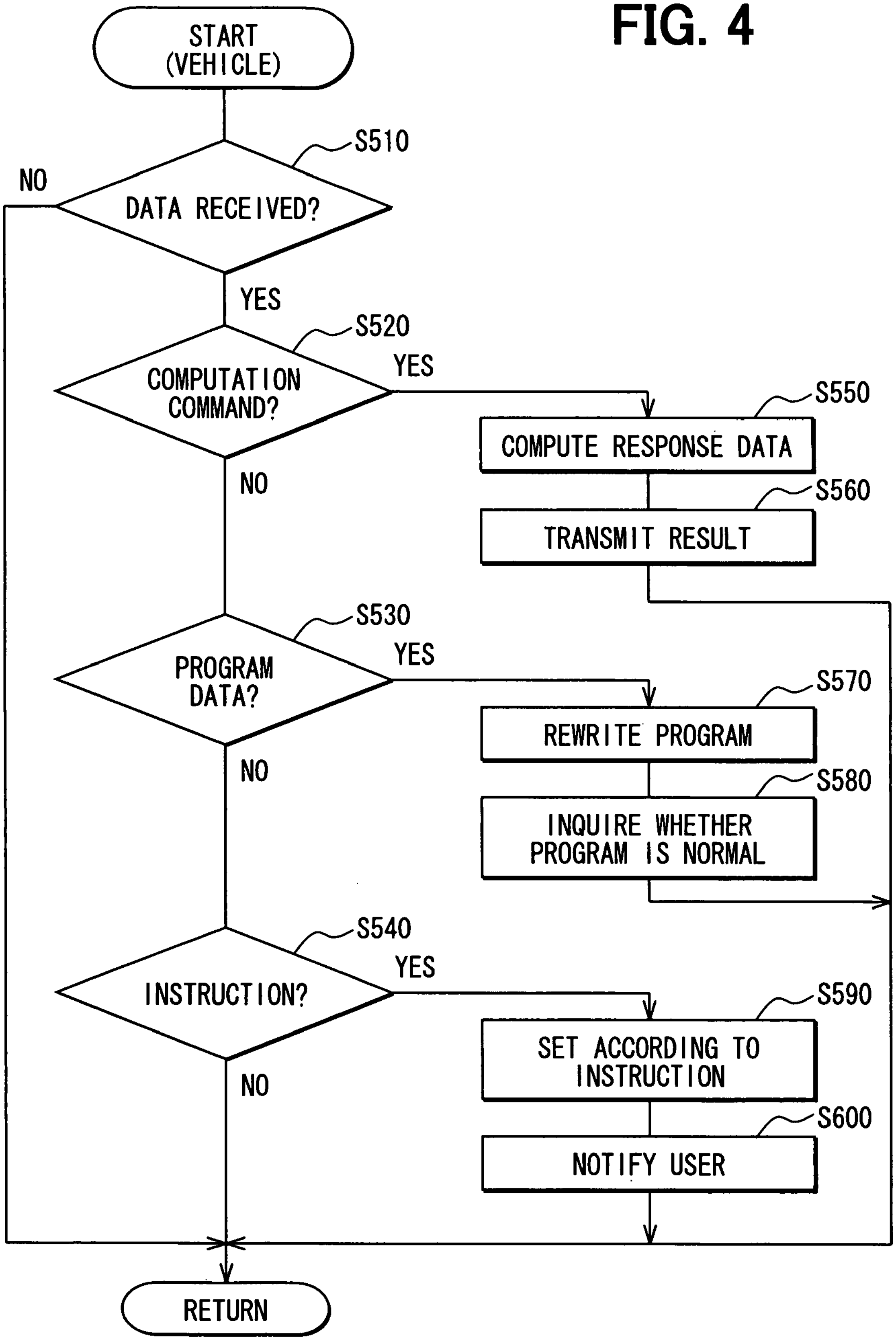
FIG. 4 is a flowchart illustrating vehicle processing in the first embodiment.

Description will be given to the processing carried out in the vehicle 30 in correspondence with this management processing with reference to FIG. 4. FIG. 4 is a flowchart illustrating the vehicle processing carried out by the vehicle control device 31 (CPU 31*a*) of the vehicle 30.

This vehicle processing is started when the IG (ignition) of a vehicle is turned on. First, it is determined whether or not any data has been received from the management center 10 (S510). When any data has not been received from the management center 10 (S510: NO), the vehicle processing is repeated from the first.

When some data has been received from the management center 10 (S510: YES), it is determined whether or not the received data is a computation command (S520). The computation command determined through this processing corresponds to the computation command transmitted at S120 and S230 of the management processing.

When the received data is a computation command (S520: YES), specified computing method and examination area are selected from the control program based on the contents of the computation command, and response data is computed according to this control program (S550: communication control means or unit), and a computation result is transmitted to the management center 10 (S560: communication control means or unit). Thereafter, the vehicle processing is repeated from the first.

When the received data is not a computation command (S520: NO), it is determined whether or not the received data is program data (S530). The program data determined through this processing corresponds to the program data transmitted at S200 of the management processing.

When the received data is program data (S530: YES), the control program stored in the rewritable memory 31*d* is rewritten with the received program data (S570: rewriting means or unit). Then, an inquiry request to confirm whether or not the program has been normally rewritten is transmitted to the management center 10 (S580: inquiring means or unit), and the vehicle processing is repeated from the first.

When the received data is not program data (S530: NO), it is determined whether or not the received data is an instruction to bring the engine 35 into a start enabled state or a start disabled state (S540). The instruction to bring the engine 35 into a start enabled state or a start disabled state, determined through this processing corresponds to the instructions transmitted at S190 and S300 of the management processing.

When the received data is an instruction to bring the engine 35 into a start enabled state or a start disabled state (S540: YES), the engine 35 of the vehicle 30 is brought into a start enabled state or a start disabled state (S590: prohibiting means or unit, releasing means or unit). To bring the vehicle 30 into a start disabled state, for example, it is possible to prohibit the starter 37 from being driven. To bring the vehicle 30 into a start enabled state, it is possible to withdraw the prohibition against driving of the starter 37.

After this processing is completed, the state (start enabled state or start disabled state) established at S590 is notified to the user of the vehicle 30 (S600: first notifying means or unit), and the vehicle processing is repeated from the first.

In the program management system 1 described in detail above, the program management control unit 11 of the management center 10 selects at least one from multiple preset examination methods through the management processing (S110). Then, it requests data based on the selected examination method from the vehicle control device 31 (S120). It receives data transmitted from the vehicle control device 31 of the vehicle 30 in response to the request, and determines whether or not the value of the received data is within a preset permissible range. The program management control unit thereby determines the presence or absence of an anomaly in a program stored in the vehicle control device 31 (S150 to S180).

When the vehicle control device 31 of the vehicle 30 receives a request for data specifying an examination method from the management center 10 during the vehicle processing, it carries out the following processing: according to the examination method specified by this request, it extracts data pertaining to the program held in the vehicle control device 31, and transmits this extracted data to the management center 10 (S550, S560).

With this program management system 1, therefore, the vehicle 30 is caused to transmit data corresponding to the examination method specified at the management center 10. Therefore, when there is no anomaly in the control program installed in the vehicle 30, the vehicle control device 31 can transmit data based on the specified examination method. Meanwhile, when there is any anomaly in the control program installed in the vehicle 30, the vehicle control device 31 cannot transmit data based on the specified examination method.

Therefore, the program management control unit 11 of the management center 10 can reliably detect any anomaly in the control program installed in the vehicle 30 based on data received from the vehicle 30.

During the management processing, the program management control unit 11 selects an examination area that is at least part of the program data held in the vehicle control device 31 as an examination method (S110). The vehicle control device 31 extracts data in the selected examination area from the program data held in the vehicle control device 31, and transmits it to the management center 10 (S550, S560).

With this program management system 1, therefore, a different examination area can be selected on an examination-by-examination basis, and this makes it difficult to predict which examination area will be selected with respect to each examination. Therefore, even an anomaly in a program caused by tampering the program can be detected without fail.

In addition, the program management control unit 11 is so constructed that it can select every piece of program data held by the vehicle control device 31 as a program to be examined.

With this program management system 1, therefore, the following is implemented: when it is desirable to check all the programs, for example, when a program has been rewritten, all the pieces of program data held as a program to be examined can be selected. For this reason, the program data can be examined with reliability.

Further, the program management control unit 11 selects at least one from multiple computing methods held by the vehicle control device 31. In the vehicle processing, the vehicle control device 31 of the vehicle 30 computes data pertaining to the preset program held by the vehicle control device 31 according to the selected computing method. Then, it transmits data indicating the result of this computation to the management center 10 (S550, S560).

With this program management system 1, therefore, computing methods are different even when data used in computation is identical. For this reason, different data can be transmitted to the management center 10 depending on the computing method.

In the management processing, the program management control unit 11 estimates the range of the value of data transmitted from the vehicle control device 31 (S140).

With this program management system 1, therefore, any anomaly in a program can be appropriately determined even when data the value of which varies with time is acquired from the vehicle control device 31.

In addition, the program management system 1 is so constructed that a checksum method can be selected as the computing method.

Therefore, when a checksum method is selected in this program management system 1, the following advantage is brought: since the checksum method is simple in program logic, the computing speed can be enhanced. As a result, the responsibility in communication can be enhanced.

The vehicle control device 31 is mounted in a vehicle. When it is determined through the management processing that there is an anomaly in a program installed in the vehicle control device 31, the program management control unit 11 instructs the vehicle control device 31 to bring the vehicle 30 into a start disabled state. In response to receipt of an instruction to bring the vehicle 30 into a start disabled state from the management center 10, the vehicle control device 31 prohibits the vehicle 30 from being started (S590).

With this program management system 1, therefore, starting of the vehicle 30 can be prohibited when there is an anomaly in a program. As a result, the vehicle 30 can be prevented from being operated with an anomaly in a program.

In addition, when starting of the vehicle is prohibited, the vehicle control device 31 notifies a preset point of contact (e.g., user) that starting of the vehicle has been prohibited (S600).

With this program management system 1, therefore, it can be notified to a preset point of contact that starting of the vehicle 30 has been prohibited. Consequently, a reason why the vehicle 30 has become incapable of being started can be easily identified. The personnel at a point of contact can recognize that some anomaly has occurred in a program.

When the program management control unit 11 determines that there is an anomaly in a program installed in the vehicle control device 31, it transmits a legitimate program to the vehicle control device 31 (S200). In response to receipt of a legitimate program from the management center 10, the vehicle control device 31 rewrites the program held by the vehicle control device 31 with the legitimate program (S570).

With this program management system 1, therefore, a program can be rewritten with a legitimate program when any anomaly is detected in the program.

As a result, it is unnecessary for an operator to rewrite a program in the vehicle control device 31, and thus the operation of rewriting a program can be simplified. Since it is unnecessary to bring the vehicle to a dealer or a maintenance shop, a task burdensome to the user of the vehicle 30 can be omitted and the convenience to the user can be enhanced.

After the vehicle control device 31 rewrites a program in the vehicle processing, it transmits at least part of the rewritten program data to the management center 10 to inquire about the validity of the rewritten program. (S580). When the program management control unit 11 receives inquiry about the validity of the program from the vehicle control device 31, it receives data transmitted from the vehicle control device 31 in response to the inquiry. When the value of the received data is within a preset permissible range, the program management control unit determines that there is no anomaly in the program installed in the vehicle control device 31. When the value of the received data is out of the permissible range, it determines that there is an anomaly in the program installed in the vehicle control device 31 (S260, S270).

With this program management system 1, therefore, the following advantage is brought: after a program installed in the vehicle control device 31 is rewritten, it can be confirmed whether or not there is any anomaly in the rewritten program.

When it is determined that there is no anomaly in the program, the program management control unit 11 instructs the vehicle control device 31 to bring the vehicle 30 into a start enabled state (S300). In response to receipt of the instruction to bring the vehicle 30 into a start enabled state from the management center 10, the vehicle control device 31 withdraws the prohibition against starting of the vehicle (S590).

With this program management system 1, therefore, the following can be implemented: when a program is rewritten and is transferred from an anomalous state to a normal state, starting of the vehicle 30 can be permitted.

When the program management control unit 11 determines that there is an anomaly in a program installed in the vehicle control device 31, it initiates the processing of S200 again (S260, S270).

With this program management system 1, therefore, the following advantage is brought: when there is any anomaly in a rewritten program, the program can be rewritten again, and thus the reliability of program rewriting can be enhanced.

Further, the program management control unit 11 monitors the number of times when it was determined that there was an anomaly in a program. When the monitored number of times becomes equal to or larger than a preset predetermined number of times, it notifies a preset point of contact that the program cannot be normally rewritten (S290).

With this program management system 1, therefore, the following advantage is brought: when a program cannot be rewritten, that can be notified to a predetermined point of contact. As a result, any anomaly in a program can be promptly notified to the user or the like.

The management processing by the program management control unit 11 and the vehicle processing by the vehicle control device 31 are periodically started.

With this program management system 1, therefore, it can be periodically examined whether or not there is any anomaly in a program. Thus, even when any anomaly occurs in a program, that anomaly can be relatively promptly detected.

Second Embodiment

Description will be given to a program management system 1 in another embodiment. Detailed description of this embodiment (second embodiment) will be given only to a difference from the first embodiment. The same members as in the first embodiment will be marked with the same reference numerals, and the description of them will be omitted.

In the program management system 1 in this embodiment, the vehicle 30 sets a computing method and an examination area for the vehicle itself to examine a control program.

Figure 5A:
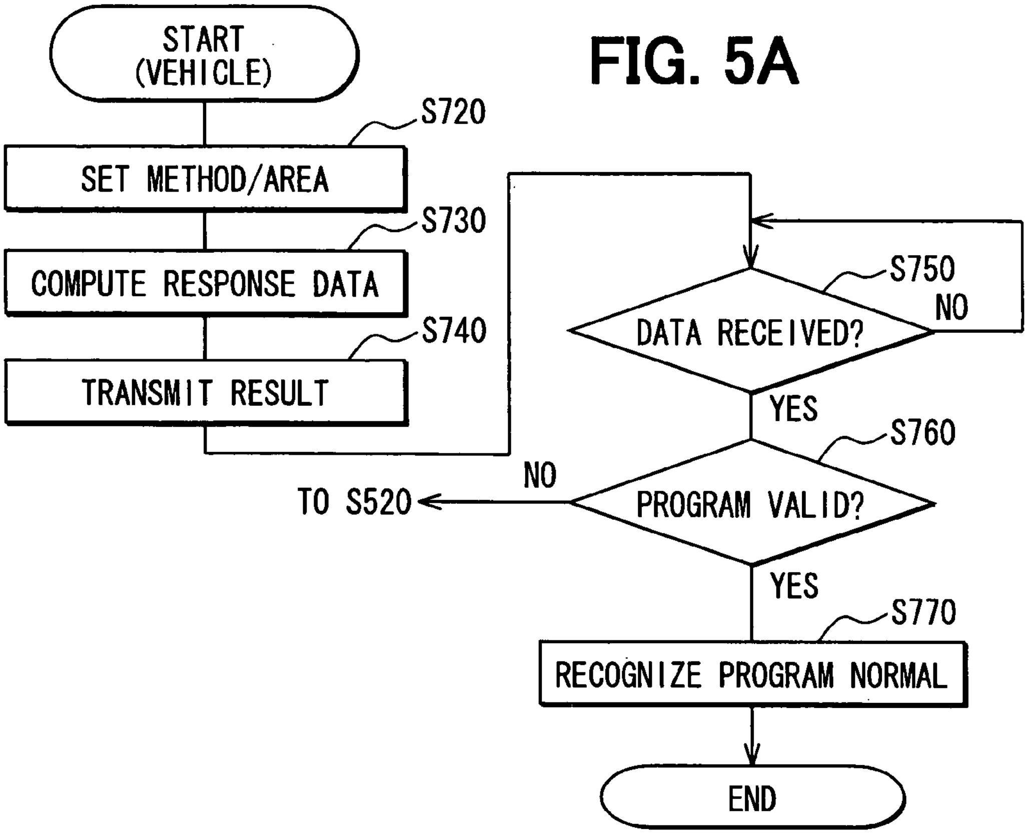
FIG. 5A is a flowchart illustrating vehicle processing in a second embodiment.
Figure 5B:
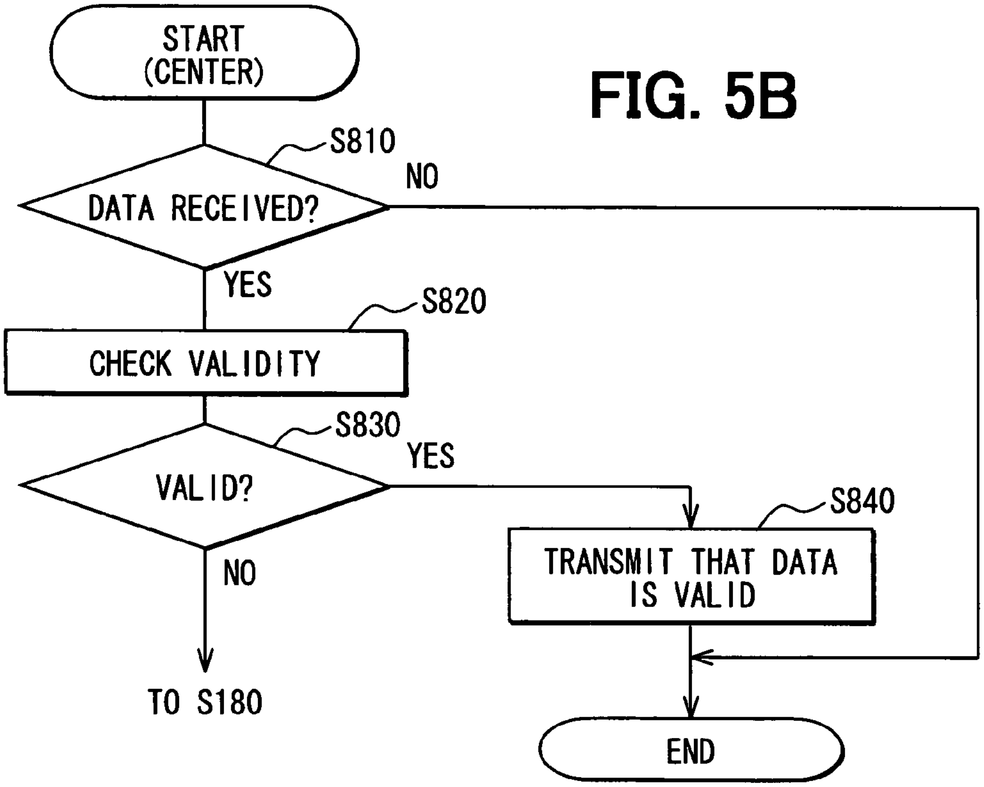
FIG. 5B is a flowchart illustrating management processing in the second embodiment.

Description will be given to a concrete example of this processing with reference to FIGS. 5A and 5B. FIG. 5A is a flowchart illustrating the vehicle processing in the second embodiment, carried out by the vehicle control device 31 (CPU 31*a*) of a vehicle 30. FIG. 5B is a flowchart illustrating the management processing in the second embodiment, carried out by the program management control unit 11 (CPU) of a management center 10.

The vehicle processing in this embodiment is repeatedly started when the vehicle control device 31 is started, when the ignition is turned off and the vehicle control device is shut down, or at predetermined time intervals (start control means or unit). As illustrated in FIG. 5A, first, a computing method and an examination area are determined on a random basis (S720: examination method selecting means or unit, examination area selecting means or unit, computing method selecting means or unit).

In the ROM 31*b* of the vehicle 30, there are preset an examination method and an examination area in correspondence with a random number. In the processing of S720, a computing method and an examination area are determined by extracting a random number, similarly with the processing of S10.

At S730 and S740, subsequently, the same processing as of S550 and S560 of the vehicle processing in the first embodiment (FIG. 4) is carried out. Through this processing, computation corresponding to the computing method and examination area set at the vehicle 30 is carried out, and the result of this computation is transmitted to the management center 10. When the computation result is transmitted at S740, however, identification information for identifying the computing method and the examination area is added to the computation result.

It is determined whether or not any data has been received from the management center 10 (S750). When any data has not been received (S750: NO), this processing is repeated. When some data has been received (S750: YES), it is determined whether or not the received data is data indicating that a program is valid (S760).

When the received data is data indicating that the program is valid (S760: YES), it is recognized that the program is normal (S770), and the vehicle processing is terminated. When the received data is not data indicating that the program is valid (S60: NO), the processing of S520 and the following steps of the vehicle processing in the first embodiment (FIG. 4) is carried out.

As illustrated in FIG. 5B, the management processing in this embodiment is repeatedly carried out when the management center 10 is on. First, it is determined whether or not the data of a computation result containing identification information indicating a computing method and an examination area has been received from the vehicle 30 (S810). When the data of a computation result has not been received (S810: NO), the management processing is terminated. When the data of a computation result has been received (S810: YES), the validity of the received data is checked (S820: data range determining means or unit).

In the management center 10 in this embodiment, reference data corresponding to the computing method and the examination area is stored beforehand in memory, such as ROM, of the program management control unit 11. When the data of a computation result is transmitted from the vehicle 30 in the processing of S820, reference data corresponding to the computing method and the examination area is extracted based on identification information contained in this data. This reference data is compared with the data of the computation result.

Next, the validity of the received data (i.e., whether or not the reference data and the data of the computation result agree with each other) is determined (S830: data range determining means or unit).

When the received data is valid (S830: YES), information indicating that the data is valid is transmitted to the vehicle 30 (S840), and the management processing is terminated. When the received data is invalid (S830: NO), the processing of S180 and the following steps of the management processing in the first embodiment (FIG. 2) is carried out.

In the above-mentioned program management system 1 in the second embodiment, the vehicle control device 31 sets the examination method (S720), and transmits data pertaining to the selected examination method together with the identification information indicating the examination method (S730, S740). At the management center 10, it is determined whether or not the correspondence between the identification information and the data is valid (S820, S830).

In this program management system 1, therefore, the vehicle control device 31 transmits data corresponding to the examination method specified by the vehicle control device itself, together with the identification information, to the management center 10. Consequently, when there is no anomaly in a control program installed in the vehicle control device 31, the vehicle control device 31 can transmit data to be transmitted and identification information corresponding to this data. Meanwhile, when there is any anomaly in a control program installed in the vehicle control device 31, the vehicle control device 31 cannot bring identification information into correspondence with data to be transmitted.

Therefore, the management center 10 can reliably detect any anomaly in a control program installed in the vehicle control device 31 based on data received from the vehicle 30.

Other Embodiments

The mode for carrying out the invention is not limited to the above embodiments, and the invention can be variously modified without departing from its technical scope.

Some examples will be taken. In the processing of S110 of the management processing in the above embodiments, an examination method to be selected is determined based on the timing with which the processing is started. Instead, an examination method to be selected may be determined based on the previously selected examination method, for example.

In the above embodiments, at least part of program data is extracted as the data pertaining to a program held by the vehicle control device 31. Instead, a parameter used by this program may be extracted. Or, a computation result obtained by fragmentarily extracting a program and carrying out computation based on the extracted data may be extracted.

In the processing of S120 of the management processing by the program management control unit 11, only an examination method to be carried out by the vehicle control device 31 is specified from multiple examination methods stored beforehand in the vehicle control device 31. Instead, for example, the following procedure may be adopted: an examination program for examination is transmitted to the vehicle control device 31, and the vehicle control device 31 is caused to execute this examination program and data is thereby received from the vehicle control device 31.

When a control program is updated to a legitimate program, in the above embodiments, the vehicle control device 31 of the vehicle 30 transmits an inquiry request to the management center 10 before transmitting program data. Instead, program data may be transmitted as an inquiry request.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A computer program management system for reliably testing computer program anomalies in a vehicular computer program memory, said system comprising:

a vehicle control device having an executable computer program stored in a digital memory; and a management device managing the computer program of the vehicle control device, the vehicle control device and the management device communicating with each other, the vehicle control device comprising:

a communication control unit that (a) receives a request for data, the request specifying a computing method, which is one of a plurality of preset computing methods, from the management device, (b) computes data pertaining to the computer program using the specified computing method to process the contents of at least a portion of said digital memory, and (c) transmits the computed data to the management device, the management device comprising:

a computing method selecting unit that selects at least one computing method from said plurality of preset computing methods;

a requesting unit that makes a request for data based on the selected computing method to the vehicle control device; and a data range determining unit that receives the data transmitted by the communication control unit of the vehicle control device based on the request by the requesting unit, and determines that there is no anomaly in the computer program installed in the vehicle control device when the received data is within a preset permissible range or that there is an anomaly in the computer program when the received data is out of the preset permissible range.

2. A computer program management system for reliably testing computer program anomalies in a vehicular computer program memory, said system comprising:

a vehicle control device having an executable computer program stored in a digital memory; and a management device managing the computer program of the vehicle control device, the vehicle control device and the management device communicating with each other, the vehicle control device comprising:

a computing method selecting unit that selects at least one computing method from a plurality of preset computing methods; and a communication control unit that (a) computes data pertaining to the computer program according to the selected computing method by processing the contents of at least a portion of said digital memory and (b) transmits the computed data, together with identification information indicating the selected computing method, to the management device, the management device comprising:

a data range determining unit that receives computed data transmitted by the communication control unit of the vehicle control device and determines (a) that there is no anomaly in the computer program installed in the vehicle control device when the received computed data is within a permissible range preset in correspondence with the identification information or (b) that there is an anomaly in the computer program when the received computed data is out of the permissible range.

3. The computer program management system of claim 1, wherein the computing method selecting unit includes an examination area selecting unit for selecting an examination area of said digital memory that contains at least part of the executable computer program code held by the vehicle control device for use by the computing method, and wherein the communication control unit computes data using the contents of an examination area of said digital memory selected by the examination area selecting unit from executable computer program code held by the vehicle control device and transmits the computed data to the management device.

4. The computer program management system of claim 3, wherein the examination area selecting unit selects only the examination ending address of the examination area in said digital memory, and wherein the communication control unit (a) computes data using the contents of said digital memory from a preset examination starting address to the examination ending address selected by the examination area selecting unit, and (b) transmits the computed data to the management device.

5. The computer program management system of claim 3, wherein the examination area selecting unit sets an examination area of said digital memory containing data preset as important data.

6. The computer program management system of claim 3, wherein the examination area selecting unit selects all the computer program data held by the vehicle control device as computer program code to be examined by processing it using the specified computing method.

7. The computer program management system of claim 1, wherein the computing method selecting unit selects at least one computing method from a plurality of computing methods held by the vehicle control device as the computing method, and wherein the communication control unit carries out computation using data pertaining to the computer program held by the vehicle control device according to a computing method selected by the computing method selecting unit, and transmits data indicating the result of the computation to the management device.

8. The computer program management system of claim 1, wherein the management device includes a reckoning unit for reckoning a range of data transmitted from the vehicle control device.

9. The computer program management system of claim 8, wherein the data range determining unit determines that there is no anomaly in a computer program installed in the vehicle control device when received data agrees with preset reference data stored in the management device or that there is an anomaly in a computer program installed in the vehicle control device when the received data disagrees with the reference data, and wherein the computing method selecting unit selects a checksum method as the computing method.

10. The computer program management system of claim 1, wherein the management device includes a first instructing unit that, when it is determined by the data range determining unit that there is an anomaly in a computer program installed in the vehicle control device, instructs the vehicle control device to bring the vehicle into a start disabled state, and wherein the vehicle control device includes a prohibiting unit that, when an instruction to bring the vehicle into a start disabled state is received from the management device, prohibits the vehicle from being started.

11. The computer program management system of claim 10, further comprising:

a first notifying unit that, when the prohibiting unit prohibits the vehicle from being started, notifies a preset point of contact that starting of the vehicle has been prohibited.

12. The computer program management system of claim 10, wherein the management device includes a computer program transmitting unit that, when it is determined by the data range determining unit that there is an anomaly in a computer program installed in the vehicle control device, transmits a legitimate computer program to the vehicle control device, and wherein the vehicle control device includes a rewriting unit that, when a legitimate computer program is received from the management device, rewrites the computer program held by the vehicle control device with the received legitimate computer program.

13. The computer program management system of claim 12, wherein the vehicle control device includes an inquiring unit that, after a computer program is rewritten by the rewriting unit, inquires about validity of the rewritten computer program, and wherein the management device includes a rewrite determining unit that, when inquiry about the validity of a computer program is received from the vehicle control device, receives data transmitted from the vehicle control device in correspondence with the inquiry, and determines that there is no anomaly in the computer program installed in the vehicle control device when the value of the received data is within a preset permissible range or that there is an anomaly in the computer program installed in the vehicle control device when the value of the received data is out of the permissible range.

14. The computer program management system of claim 13, wherein the management device includes a second instructing unit that, when it is determined by the rewrite determining unit that there is no anomaly in a computer program, instructs the vehicle control device to bring the vehicle into a start enabled state, and wherein the vehicle control device includes a releasing unit that, when an instruction to bring the vehicle into a start enabled state is given by the management device, withdraws the prohibition against starting of the vehicle established by the prohibiting unit.

15. The computer program management system of claim 13, wherein when the rewrite determining unit determines that there is an anomaly in a computer program installed in the vehicle control device, the rewrite determining unit actuates the computer program transmitting unit again.

16. The computer program management system of claim 15, further comprising:

a monitoring unit that monitors the number of times when it was determined by the rewrite determining unit that there is an anomaly in a computer program; and a second notifying unit that, when a number of times monitored by the monitoring unit becomes equal to or larger than a preset predetermined number of times, notifies a preset point of contact that the computer program is not normally rewritten.

17. The computer program management system of claim 1, further comprising:

a start control unit that starts the computing method selecting unit on at least any occasion of (a) when the vehicle control device is started, (b) at predetermined time intervals when the vehicle control device is on, and (c) when the vehicle control device is shut down.

18. The computer program management system of claim 2, wherein the computing method selecting unit includes an examination area selecting unit for selecting an examination area of said digital memory that contains at least part of the computer program code held by the vehicle control device as the computing method, and wherein the communication control unit computes data in an examination area selected by the examination area selecting unit from computer program code held by the vehicle control device and transmits the computed data to the management device.

19. The computer program management system of claim 18, wherein the examination area selecting unit selects only the examination ending address of the examination area of said digital memory, and wherein the communication control unit computes data using the contents of said digital memory from a preset examination starting address to the examination ending address selected by the examination area selecting unit from computer program code held by the vehicle control device, and transmits the computed data to the management device.

20. The computer program management system of claim 18, wherein the examination area selecting unit sets an examination area from a portion of said digital memory preset as important data.

21. The computer program management system of claim 18, wherein the examination area selecting unit selects all the computer program code held by the vehicle control device as a computer program to be examined.

22. The computer program management system of claim 2, wherein the computing method selecting unit selects at least one computing method from a plurality of computing methods held by the vehicle control device as the examination method, and wherein the communication control unit carries out computation using computer program code held by the vehicle control device according to a computing method selected by the computing method selecting unit, and transmits data indicating the result of the computation to the management device.

23. The computer program management system of claim 2, wherein the management device includes a reckoning unit for reckoning a range of computed data transmitted from the vehicle control device.

24. The computer program management system of claim 23, wherein the data range determining unit determines that there is no anomaly in a computer program installed in the vehicle control device when received data agrees with preset reference data stored in the management device or that there is an anomaly in a computer program installed in the vehicle control device when the received data disagrees with the reference data, and wherein the computing method selecting unit selects a checksum method as the computing method.

25. The computer program management system of claim 2, wherein the management device includes a first instructing unit that, when it is determined by the data range determining unit that there is an anomaly in a computer program installed in the vehicle control device, instructs the vehicle control device to bring the vehicle into a start disabled state, and wherein the vehicle control device includes a prohibiting unit that, when an instruction to bring the vehicle into a start disabled state is received from the management device, prohibits the vehicle from being started.

26. The computer program management system of claim 25, further comprising:

a first notifying unit that, when the prohibiting unit prohibits the vehicle from being started, notifies a preset point of contact that starting of the vehicle has been prohibited.

27. The computer program management system of claim 25, wherein the management device includes a computer program transmitting unit that, when it is determined by the data range determining unit that there is an anomaly in a computer program installed in the vehicle control device, transmits a legitimate computer program to the vehicle control device, and wherein the vehicle control device includes a rewriting unit that, when a legitimate computer program is received from the management device, rewrites the computer program held by the vehicle control device with the received legitimate computer program.

28. The computer program management system of claim 27, wherein the vehicle control device includes an inquiring unit that, after a computer program is rewritten by the rewriting unit, inquires about validity of the rewritten computer program, and wherein the management device includes a rewrite determining unit that, when inquiry about the validity of a computer program is received from the vehicle control device, receives data transmitted from the vehicle control device in correspondence with the inquiry, and determines that there is no anomaly in the computer program installed in the vehicle control device when the value of the received data is within a preset permissible range or that there is an anomaly in the computer program installed in the vehicle control device when the value of the received data is out of the permissible range.

29. The computer program management system of claim 28, wherein the management device includes a second instructing unit that, when it is determined by the rewrite determining unit that there is no anomaly in a computer program, instructs the vehicle control device to bring the vehicle into a start enabled state, and wherein the vehicle control device includes a releasing unit that, when an instruction to bring the vehicle into a start enabled state is given by the management device, withdraws the prohibition against starting of the vehicle established by the prohibiting unit.

30. The computer program management system of claim 28, wherein when the rewrite determining unit determines that there is an anomaly in a computer program installed in the vehicle control device, the rewrite determining unit actuates the computer program transmitting unit again.

31. The computer program management system of claim 30, further comprising:

a monitoring unit that monitors the number of times when it was determined by the rewrite determining unit that there is an anomaly in a computer program; and a second notifying unit that, when a number of times monitored by the monitoring unit becomes equal to or larger than a preset predetermined number of times, notifies a preset point of contact that the computer program is not normally rewritten.

32. The computer program management system of claim 2, further comprising:

a start control unit that starts the computing method selecting unit on at least any occasion of (a) when the vehicle control device is started, (b) at predetermined time intervals when the vehicle control device is on, and (c) when the vehicle control device is shut down.

33. A computer program management system for reliably testing computer program anomalies in a vehicular computer program memory, said system comprising:

a vehicle control device having an executable computer program stored in a digital memory;

a management device managing the computer program of the vehicle control device; and a communication control unit in the vehicle control device for communicating data with the management device;

computing method selecting means for selecting at least one computing method from a plurality of preset computing methods;

computing means for computing data pertaining to the computer program according to the selected computing method by processing the contents of at least a portion of said digital memory; and data range determining means for determining (a) that there is no anomaly in the computer program installed in the vehicle control device when the computed data is within a preset permissible range or (b) that there is an anomaly in the computer program when the computed data is out of the preset permissible range.

* * * * *